United States Patent [19]

Shikaumi et al.

[11] Patent Number: 4,965,619
[45] Date of Patent: Oct. 23, 1990

[54] IMAGE STABILIZING DEVICE

[75] Inventors: Masao Shikaumi; Toru Nagata, both of Yokohama; Koichi Washisu; Hiroshi Sumio, both of Tokyo, all of Japan

[73] Assignee: Canon Kabushiki Kaisha, Tokyo, Japan

[21] Appl. No.: 299,077

[22] Filed: Jan. 19, 1989

[30] Foreign Application Priority Data

Jan. 20, 1988 [JP] Japan ................... 63-10043

[51] Int. Cl.$^5$ .............................. G03B 7/00
[52] U.S. Cl. ................... 354/410; 354/430; 354/70; 354/65
[58] Field of Search ............. 354/410, 430, 70, 65

[56] References Cited

U.S. PATENT DOCUMENTS

| | | | |
|---|---|---|---|
| 3,728,948 | 4/1973 | Fraser | 354/70 |
| 3,910,694 | 10/1975 | De La Cierva | 354/70 |
| 4,013,339 | 3/1977 | Ando et al. | 354/70 |
| 4,290,684 | 9/1981 | Hines | 354/70 |
| 4,780,739 | 10/1988 | Kawakami et al. | 354/430 |

*Primary Examiner*—Russell E. Adams
*Attorney, Agent, or Firm*—Fitzpatrick, Cella, Harper & Scinto

[57] ABSTRACT

An image stabilizing device prevents the image blur caused by the vibration of an optical system, is provided with image stabilizing means for preventing the image blur caused by the vibration of the optical system; and a control unit for controlling the image stabilizing means in automatic response to the status of the camera body.

22 Claims, 6 Drawing Sheets

IMAGE STABILIZING DEVICE

BACKGROUND OF THE INVENTION

1. Field of the Invention

The present invention relates to an image stabilizing device for preventing image blur caused by shaking of an optical system, and more particularly to an image stabilizing device capable of properly responding to various operations in a camera.

2. Related Background Art

There have been proposed various control devices for image stabilization, or for preventing image blur caused by shaking of the camera. Such a device is generally constructed as a feedback control mechanism for controlling a lens system in such a manner as to suppress the displacement of the image caused by radial shaking of the lens system.

For example, the vibration of a camera (usually vibration in a direction inclined to the optical axis of photographing) is detected as an acceleration signal, which is integrated in a signal processing system to obtain a displacement signal or a velocity signal, and such signal is used for driving the lens system in a direction to suppress the vibration.

In case of single-lens reflex cameras, such device is either incorporated in an interchangeable lens, or formed as an adaptor to be inserted between the camera body and the lens.

FIG. 6 shows an example of the control unit of an image stabilizing device with a conventional signal processing system, wherein an acceleration detector 101 detects the inclination of a camera (not shown) with respect to the optical axis, as an acceleration signal. The acceleration signal a is integrated by a first integrator 102 into a velocity signal v, which is further converted by a second integrator 103 into a displacement signal d. An actuator 105 moves, according to the displacement signal d, an imaging system 104 of the camera, said system 104 being radially movable in order to prevent image blur.

A variable resistor 106 constitutes position detecting means for detecting the actual displacement of the imaging system 104. The signal from the position detecting means is fed back to the input system of said actuator 105. In this manner there is formed a local feedback loop for controlling the imaging system 104 in correspondence with the displacement caused by vibration. An operational amplifier 107 is provided between the integrator 103 and the actuator 105. A spring 108 biases the imaging system 104 to an end of the movable stroke thereof when the actuator 105 is not energized. Thus, the radial position of the imaging system 104 is determined by the balance between the force generated by the actuator 105 and the force of the spring 108. The position of the imaging system 104 at the center of the movable stroke therein is represented by l/2 measured from the position of the imaging system 104 when the actuator 105 is not energized, wherein l represents the entire radial stroke of the imaging system 104.

When the actuator 105 is energized, the image stabilizing device starts its function from a state in which the imaging system 104 is positioned at the end of the stroke closest to the actuator 105. Thus, the imaging system 104 cannot be moved further toward the actuator 105, so that satisfactory image stabilization cannot be expected. Therefore, in order to prevent such phenomenon and to secure strokes for the imaging system 104 in both radial directions, there is required a centering operation for moving the imaging system 104 to the central position (l/2) of the stroke when the actuator 105 is energized, and the image stabilizing operation is initiated after said centering.

Also, since the stroke of the actuator 105 is limited, the imaging system 104 may be brought to an end thereof in response to a very large vibration. If the shutter of the camera is released in such state, there cannot be expected satisfactorY image stabilization, and image blur will be observed in the resulting photograph. In order to prevent such phenomenon, it is necessary to conduct the centering operation prior to the release of the shutter, in order to secure the strokes of the imaging system However, such image stabilizing device is usually incorporated in the interchangeable lens, or formed as an adaptor to be positioned between the camera body and the lens as explained before, and is designed to effect the image stabilization or the centering independent from the operations in the camera body. For this reason such device has been associated with drawbacks, such as inability to properly respond when the image stabilizing operation or centering operation is required in the camera body, for example, at the start of operation therein, or at the release of the shutter, or a wasted operation of the device resulting in the consumption of battery when the image stabilization is not required by the camera.

SUMMARY OF THE INVENTION

In consideration of the foregoing, the object of the present invention is to provide an image stabilizing device, provided with image stabilizing means for preventing the image blur caused by the vibration of optical system and control means for controlling said image stabilizing means in automatic response to the state of the camera body, thereby preventing drawbacks such as inability to properly response when the image stabilizing operation o centering operation is required in the camera, for example, at the start of the operation therein, or at the release of the number, or wasted operation of the device resulting in the consumption of the battery when the camera is not in an operable state and does not require such image stabilization.

Other objects of the present invention will become fully apparent from the following description.

DETAILED DESCRIPTION OF THE PREFERRED EMBODIMENTS

Figure 1:
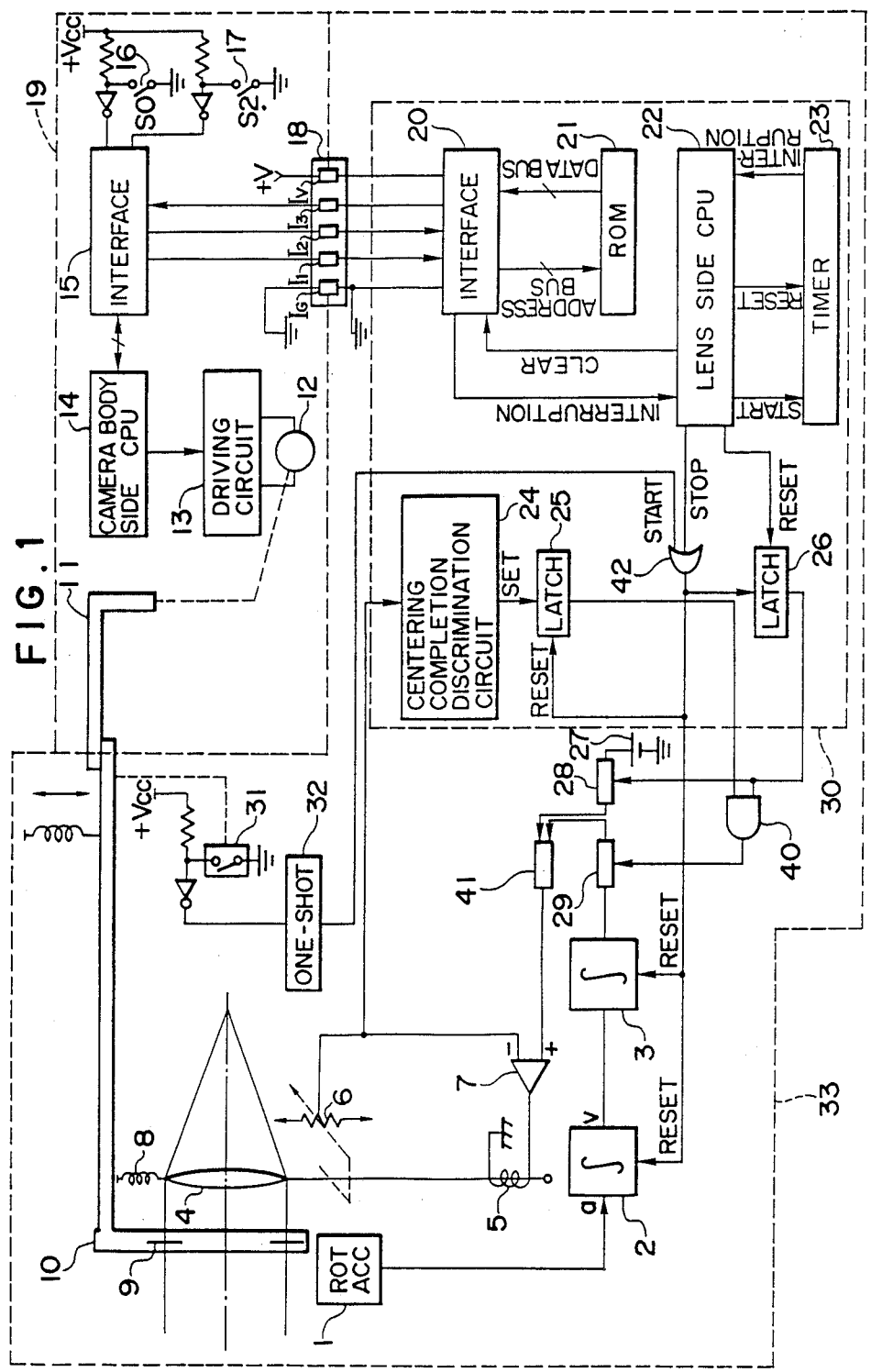
FIG. 1 is a schematic view of a first embodiment of the present invention.
Figure 6:
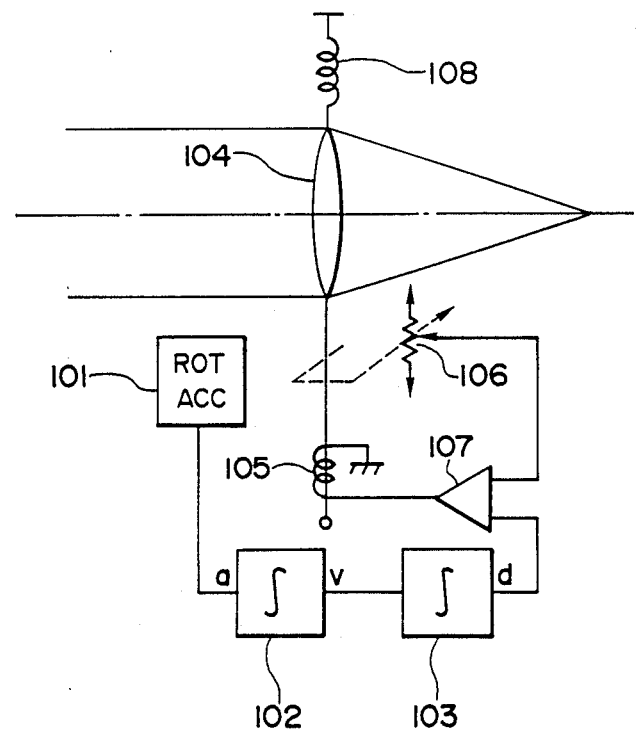
FIG. 6 is a schematic view showing an example of the prior technology.

FIG. 1 illustrates a first embodiment of the present invention, wherein there is shown an acceleration detector 1; integrators 2, 3; an imaging system 4; an actuator 5; a position detecting means 6; an operational amplifier 7; and a spring 8, which are similar to those explained in FIG. 6.

There are further shown a diaphragm 9 provided in the lens; a diaphragm link lever 10 linked with said diaphragm 9; a diaphragm control lever 11 provided in the camera body; a diaphragm actuator 12 for driving said lever 11; and a driving circuit 13. The actuator 12, when energized, moves the control lever 11, thereby pressing down the link lever 10 and closing the diaphragm 9. The camera body is usually so designed as to effect the photometering operation and distance measuring operation while the diaphragm is fully open.

There are further provided a camera CPU 14 for sequence control of the camera body, administration of communication with IC's in the camera and with external accessories, photometering and distance measurement; an interface 15 for transmitting signals from various switches in the camera body and effecting communication with external accessories including the lens; an S0 switch 16 which is closed when a shutter release button is touched by the operator; an S2 switch 17 to be closed when the shutter release button is depressed by the operator; and electrical contacts 18 provided on a mount between the camera body 19 and an interchangeable mount 33 and consisting of a ground contact $I_G$, a power supply contact $I_V$ for power supply from the camera body 19 to a lens circuit 30 in the interchangeable lens 33; a clock contact $I_1$ for the clock signals to be supplied from the camera body 19 to the lens 33 at the communication; a signal contact $I_2$ for signals from the camera body 19 to the lens 33; and a signal contact $I_3$ for signals from the lens 33 to the camera body 19.

An interface 20 effects serial-parallel conversion on the serial address data for a ROM 21 received from the camera body 19, thus sending converted address data through a data bus to the ROM 21 thereby reading corresponding data from said ROM 21 through a data bus, and effecting parallel-serial conversion on said data and sending thus converted data to the camera body 19 in synchronization with communication clock signals supplied from the camera body 19. Upon receipt of the communication clock signal from the camera body 19, the interface 20 sends an H-level interruption signal to the lens CPU 22. The interruption state is cleared with a clear pulse signal from the lens CPU 22. The ROM 21 stores various data indicating the lens characteristics.

A timer 23, in response to an H-level start signal from the lens CPU 22, initiates a timer operation by counting down an internal register at predetermined intervals, and sends an H-level interruption signal to the lens CPU 22 when the content of the internal register reaches zero. The interruption state is cleared by a shift of the start signal from the lens CPU 22 from the H-state to the L-state. Also in response to a reset pulse from said CPU 22, a predetermined value is re-loaded in the internal register of the timer 23.

A centering completion discrimination circuit 24 sends a set pulse to a latch circuit 25 when the imaging system 4 reaches a predetermined center position, in response to the position signal from the position detecting means 6 of the imaging system 4.

The latch circuit 25 is set by the set pulse from said centering completion discrimination circuit 24 and reset by the start pulse from the lens CPU 22, and sends an output signal to an AND gate 40 connected to a control terminal of an analog switch 29.

Another latch circuit 26 is set by the start pulse from the lens CPU 22 and reset by a stop pulse from the lens CPU 22, sends an output signal to an input terminal of the AND gate 40 and a control terminal of an analog switch 28.

A centering reference power source 27 generates a voltage for maintaining the imaging system 4 at the center of the movable stroke thereof.

The analog switch 28 connects or detaches the centering reference power source 27 with or from an input of adder 41, respectively, when the output of the latch circuit 26 is in the H-level or L-level.

The analog switch 29 connects or detaches the output of the integrator 3 with or from the other input of the adder 41, respectively, the outputs of the latch circuits 25, 26 are both at the H-level, or otherwise.

The adder 41 adds the outputs of the analog switches 28, 29 for supply to the operational amplifier 7.

A switch 31 linked with the diaphragm link lever 10 is turned off (L) or on (H), respectively, when the diaphragm 9 is fully open or stopped down, and an output signal thereof is supplied to a one-shot circuit 32, which releases a pulse at the shift of the output signal of the switch 31 from L-level to H-level. The output signal of the one-shot circuit 32 is supplied, through an OR gate 42, to the reset input terminals of the integrators 2, 3, the reset input terminal of the latch circuit 25, and the set input terminal of the latch circuit 26.

In the following discussion there will be explained the function of the first embodiment shown in FIG. 1.

Figure 2:
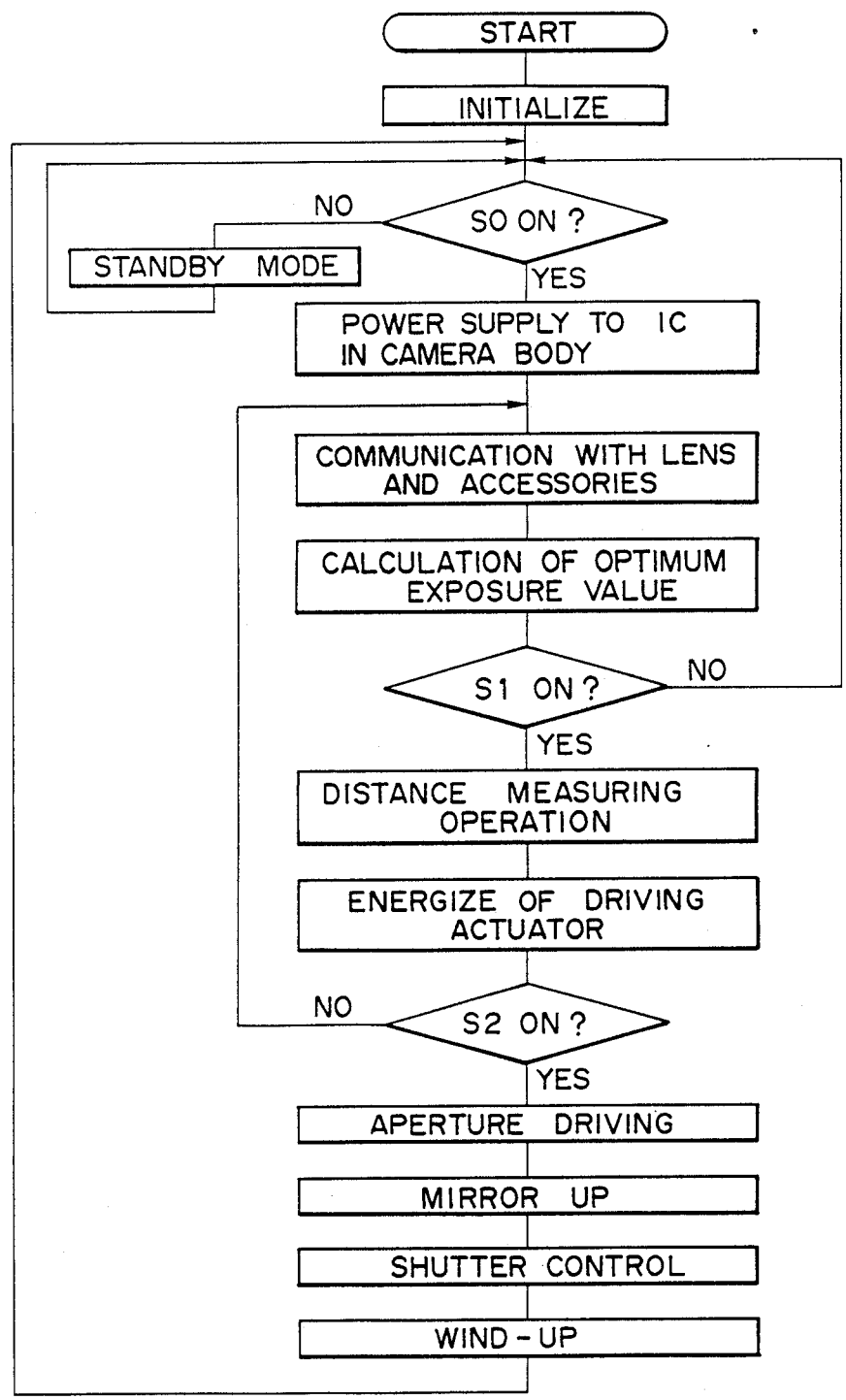
FIG. 2 is a flowchart showing the control sequence of a camera CPU shown in FIG. 1.

FIG. 2 is a flowchart showing the control sequence of the camera, body CPU 14 in the first embodiment. The status detection of each switch is represented by a polling mode in order to simplify the flow process, but it is also possible to detect the status of each switch by an interruption, with jumping in sequence, in order to achieve a quick response.

The camera body CPU 14 functions in the following manner. When the power supply is turned on, the camera body CPU 14 initializes the internal RAM and peripheral IC's, and then checks, through the interface 15, whether the S0 switch 16 is turned on.

If the switch 16 is turned off, the CPU enters a standby mode in which the power supply is minimized in order to reduce the power consumption. On the other hand, if the switch 16 is turned on, power is supplied to various IC's in the camera body. Then communication is made with the lens and accessories to obtain photographing information, and an optimum exposure value is determined on the basis of the information.

Then, the status of a switch S1 (not shown in FIG. 1) is checked, and, if it is the OFF state, the sequence returns to the step of checking the switch 16, and this loop is repeated. When the switch S1 is turned on, an automatic focusing is conducted by distance measurement, followed by adjustment of the optical system to a focused state by an automatic focusing actuator according to the calculated amount of actuator driving.

Then, the status of the S2 switch 17 is checked, and, if it is in the OFF state the returns to the step of communication with the lens and accessories. Thus, a loop of communication, photometering and distance measurement is repeated as long as the switch S1 is ON and the switch 17 is OFF. However, when the switch 17 is turned on, a shutter release sequence is started for closing the diaphragm to a predetermined level calculated from the optimum exposure value, lifting the mirror, moving the shutter curtains with controlled timing, thereby giving exposure to the photographic film, and then winding of the film together with descent of the mirror, opening of the diaphragm and charging of the shutter mechanism takes place. The shutter release sequence is terminated after the completion of film winding, and the sequence returns to the step for checking the switch 16.

In the following, there will be explained the detection of status of the switch 16 in the lens 33.

Figure 3:
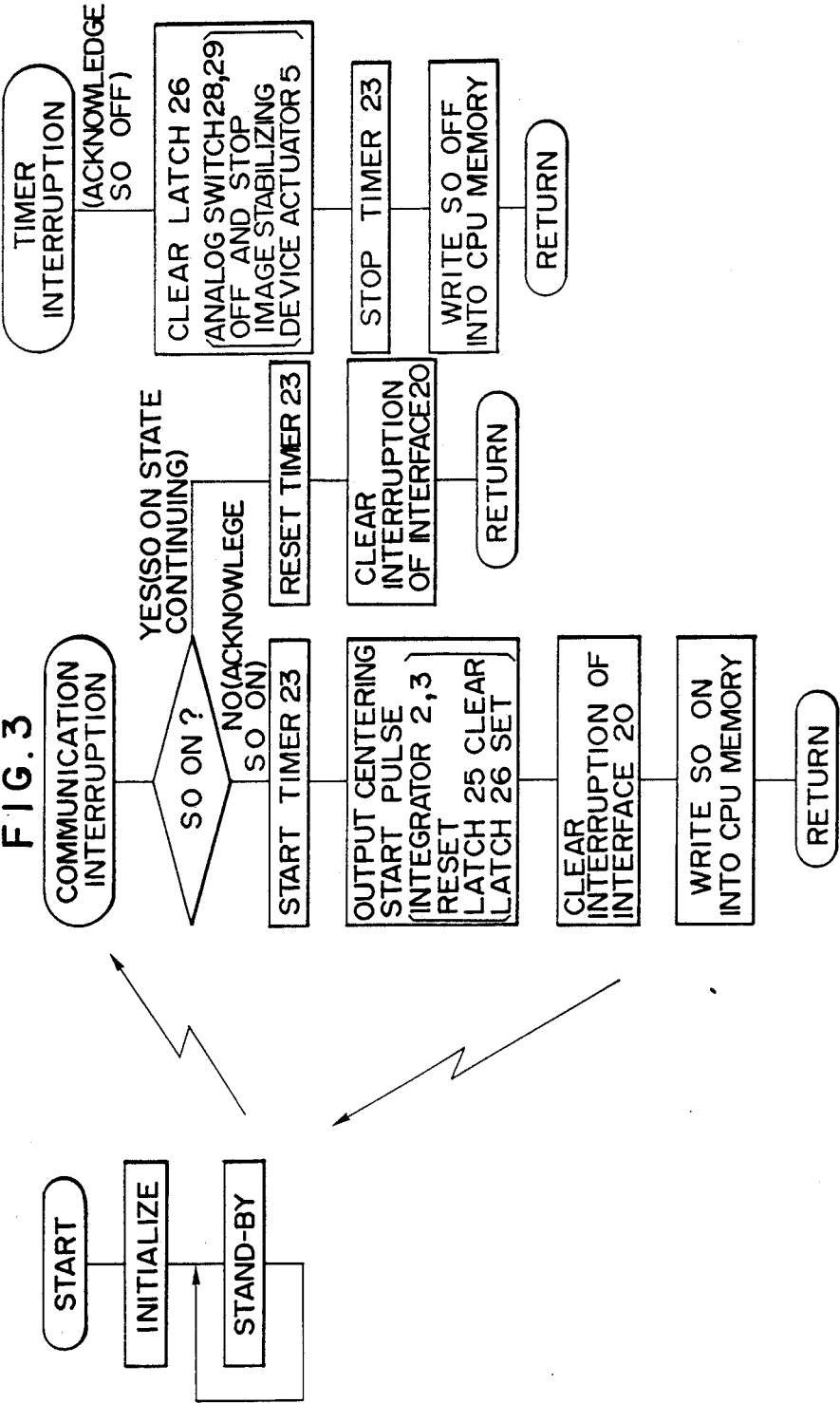
FIG. 3 is a flowchart showing the control sequence of a lens CPU.

FIG. 3 is a flowchart of the control sequence of the lens CPU 22 in the first embodiment.

At first, when the switch 16 is turned off, the camera body CPU 14 is in the stand-by mode as explained above, so that no communication is made between the camera body 19 and the lens 33. However, when the lens 33 is mounted on the camera body 19, power is supplied from the camera body 19 to the lens 33 through the electrical contact 18 of the mount. When the switch 16 is turned off, the lens CPU 22 enters a stand-by mode, after initialization of IC's in the lens circuit 30. When the operator turns on the switch 16 by touching the shutter release button, the ON-state is detected by the camera body CPU 14 through the interface 15. Thus, the camera body CPU 14 terminates the stand-by mode according to the flowchart shown in FIG. 2, starts power supply to the IC's in the camera body and performs communication with the lens and the accessories. The communication to the lens through the contacts 18 in the mount consists of communication clock signals from the interface 15 in the camera body to the interface 20 in the lens, and an address indicating necessary data stored in the ROM 21, sent in serial form in synchronization with the clock signals through the contact $I_2$. The interface 20 converts the received serial data into parallel form, and acquires the data, indicated by the address, from the ROM 21 through a data bus. Then, the interface 20 converts the data into serial form and sends the data to the camera body through the contact $I_3$, in synchronization with the communication clock signals sent from the camera body.

Also, in response to the communication clock signals from the camera body, the interface 20 sends an H-level interruption signal to the lens CPU 22, which thereby terminates the stand-by mode.

Then, the lens CPU 22 at first refers to an internal memory, which stores a status whether the switch 16 has been turned on, or not. If the internal memory indicates that the switch 16 has been turned off, the CPU 22 releases an H-level start signal to start the timer 23. A predetermined value is set in an internal register of the timer 23 at the initialization step, and is loaded again whenever a reset pulse is given to the timer 23 from the CPU 22. The timer 23 starts a down counting operation in response to the start signal. Then, the CPU 22 releases a centering start pulse, which, through an OR gate 42, resets the integrators 2, 3 and the latch 25 and sets the latch 26. In response, the latch 26 releases an H-level output signal to turn on the analog switch 28. As the latch 25 releases an L-level output signal, the AND gate 40 releases an L-level output signal, so that the analog switch 29 remains in the OFF state.

In this state, therefore, the voltage of the centering reference power source 27 alone is applied from the adder 41 to the operational amplifier 7. The actuator 5 is activated by the voltage, whereby the imaging system 4, which has been stopped at an end of the movable stroke under the force of the spring 8, starts to move toward a target position (center of the stroke) indicated by the voltage. The position of the imaging system 4 is transmitted from the position detecting means 6 to the centering completion discrimination circuit 24, which releases an H-level signal when the imaging system 4 reaches the target position at the center of the movable stroke.

In response to the latch 25 being turned on, whereby the H-level signals from the latches 25, 26 provide an H-level output signal from the AND gate 40, thus turning on the analog switch 29. Thus, the adder 41 also receives the output voltage of the integrator 3, which is added with the voltage of the centering reference power source 27 for supply to the operational amplifier 7. The image stabilizing operation is started in this manner.

Then, the lens CPU 22 sends a clear pulse to the interface 20 thereby shifting the interruption signal therefrom to the L-level, and writes a status signal, indicating that the switch 16 has been turned on, in the internal memory.

The interruption sequence by communication is then terminated, and the state prior to interruption is restored.

In the following discussion there will be explained the function in case the internal memory indicates, at the interruption, that the switch 16 has been turned on. In this case the lens CPU 22 sends a reset pulse to the timer 23, which, in response, is reset at the predetermined value and restarts the down counting operation. Then, the lens CPU 22 sends a clear pulse to the interface 20, thereby shifting the interruption signal therefrom to the L-level. The interruption sequence is then terminated.

Thus, if the communication is conducted within a predetermined period, the interruption sequence of the CPU 22 is not started by the timer 23 since it is reset every time, and the image stabilizing operation is continued under the recognition that the switch 16 has been turned on.

Then, a case in which the operator lifts the finger from the shutter release button, whereby the switch 16 is turned off is explained.

When the switch 16 is turned off, the camera body CPU 14 enters the stand-by mode, thereby terminating the communication between the camera body and the lens. Because of absence of interruption by communication, the timer 23 is no longer reset. Thus, when the internal register reaches zero after a predetermined time, the timer 23 sends an H-level interruption signal to the lens CPU 22.

In response to the timer interruption, the CPU 22 sends a reset pulse to the latch 26, thereby shifting the output thereof to the L-level. As the input to the analog switch 28 and the input to the analog switch 29 through the AND gate are both shifted to the L-level state, the centering reference power source 27 and the integrator 3 are separated from the adder 41, which thus terminates the output signal to the operational amplifier 7. Consequently, the power supply to the actuator 5 is terminated, and the image stabilizing operation is terminated.

Then, the CPU 22 shifts the start signal to the timer 23 to the L-level, thereby terminating the timer function, and clears the interruption signal from the timer 23. Subsequently, the CPU 22 writes a status, indicating that the switch 16 is turned off, in the internal memory and terminates the timer interruption sequence.

In the following discussion there will be explained the detection of status of the S2 switch 17. In the present embodiment, the lens CPU 22 is not directly involved in the detection.

When the shutter release button is depressed to turn on the switch 17, the camera body CPU 14 starts diaphragm control according to the flow chart shown in FIG. 2. The camera body CPU 14 stops down the diaphragm 9 to an amount corresponding to the optimum exposure value calculated in advance, by driving the diaphragm actuator 12 with the driving circuit 13 and depressing the diaphragm link lever 10 by means of the diaphragm control lever 11.

When the diaphragm 9 is stopped down from the fully open state, the diaphragm link lever 10 closes a switch 31 to provide an H-level input signal to the one-shot circuit 32 which in response releases a pulse at the start of the input signal. The pulse resets the integrators 2, 3 and the latch 25 through the OR gate 42. The switches 16, S1 are always on whenever the switch 17 is turned on. Consequently, according to the above-explained sequence the analog switches 28, 29 are both on, thus executing the image stabilizing operation.

The resetting of the latch 25 shifts the input to the analog switch 29 to the L-level through the AND gate, whereby the output of the integrator 3 is separated from the adder 41. Thus, the operational amplifier 7 only receives, from the adder 41, the voltage corresponding to the centering reference power source 27, thereby performing the centering operation. When the centering is completed, the latch 25 is set and the analog switch 29 is turned on according to the above-explained sequence in the ON-state of the switch 16, whereby the output of the integrator 3 is again supplied to the adder 41 and the image stabilizing operation is re-started.

In this manner, when the switch 17 is turned on, the centering operation is executed in order to secure the strokes for the image stabilizing device at the exposure operation.

The present invention is not limited to the means employed in the foregoing embodiment, but is subject to various modifications, particularly in the detection of start or end of communication, or of completion of diaphragm operation. For example, the start of communication may be detected at the first synchronization clock pulse, or after reception of single data (for example after 8 synchronization pulses in case of 8-bit data). It is also possible to attach, at the start and the end of communication form the camera body, codes indicating the start and the end of communication, and to start or terminate the image stabilizing operation when the codes are received by the lens. It is furthermore possible to employ the handshake process for the communication and to detect the start of communication by the change in the handshake line. Also, the detection of diaphragm stopping down operation may be made by the output pulse from an encoder connected with the diaphragm link lever, instead of the switch, or by inspection of the voltage on a signal contact, provided between the camera body and the lens, indicating the diaphragm operation. Also in the foregoing embodiment the image stabilizing device is incorporated in the lens, but it may also be constructed as an independent adaptor such as extender.

Figure 4:
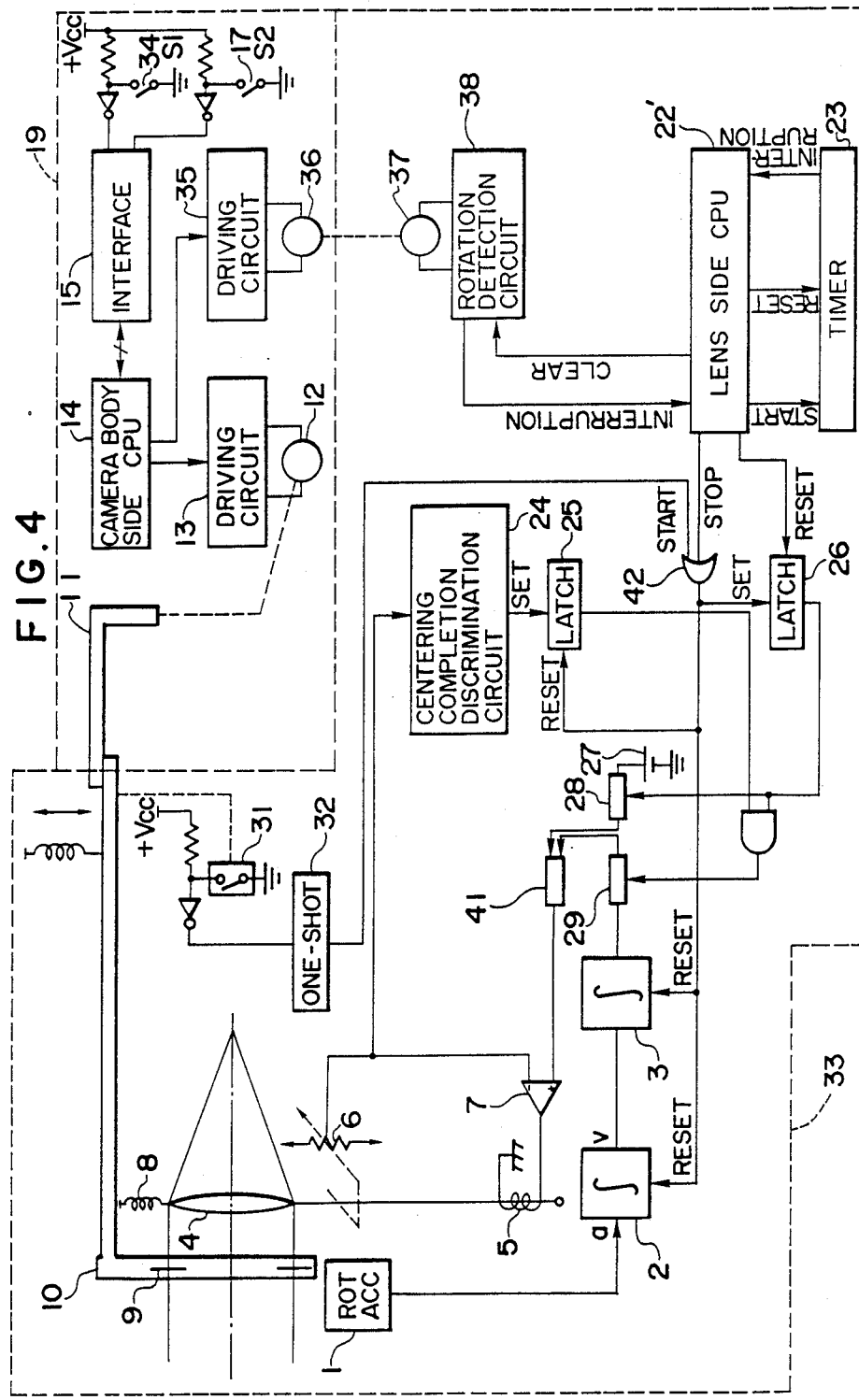
FIG. 4 is a schematic view of a second embodiment of the present invention.

FIG. 4 illustrates a second embodiment of the present invention. In the first embodiment, the actuator of the image stabilizing device is activated in response to the detection of communication between the camera body and the lens. In this second embodiment, the actuator of the image stabilizing device is activated by detecting the status of an automatic focusing actuator incorporated in the camera body, and confirming the ON-state of the switch S1 in the camera body. The components indicated by the same numbers as those in FIG. 1 and the functions thereof will not be explained again.

In FIG. 4, there are shown an S1 switch 34 to be turned on by a half-push of the shutter release button; a driving circuit 35 for driving the auto focusing actuator in response to the instruction from the camera body CPU; an auto focusing actuator 36, incorporated in the camera body, for automatically focusing the lens; an encoder 37 incorporated in the lens and adapted to generate pulses according to the rotation of the auto focusing actuator in the camera body; and a rotation detecting circuit 38 for sending an interruption signal to the lens CPU 22' in response to the pulse generated by said the encoder 37, said interruption signal being cleared by a clear signal from the lens CPU 22'.

The function of this second embodiment is similar to that of the first embodiment, except that the image stabilizing device enters the centering operation and the active state in response to the function of the auto focusing actuator 36 started by the closing of the switch 34, instead of the closing of the S0 switch in the first embodiment.

In the following discussion, there will be explained the function of detecting the closing of the switch 34.

When the S1 switch 34 is turned on by the half-push of the shutter release button, the camera body CPU 14 starts a auto focusing operation according to the flow-chart shown in FIG. 2. Thus, a known distance measuring operation is conducted with an unrepresented distance measuring unit, and the amount of movement of the auto focusing actuator 36 is calculated. Then, the actuator 36 is driven through the driving circuit 35 according to the calculated amount, whereby the focusing lens elements in the interchangeable lens are axially moved to achieve automatic focusing.

In response to the movement of the auto focusing actuator 36, the encoder 37 generates pulses. The rotation detecting circuit 38 detects the pulse generation from the encoder 37, and sends an H-level interruption signal to the lens CPU 22'.

Figure 5:
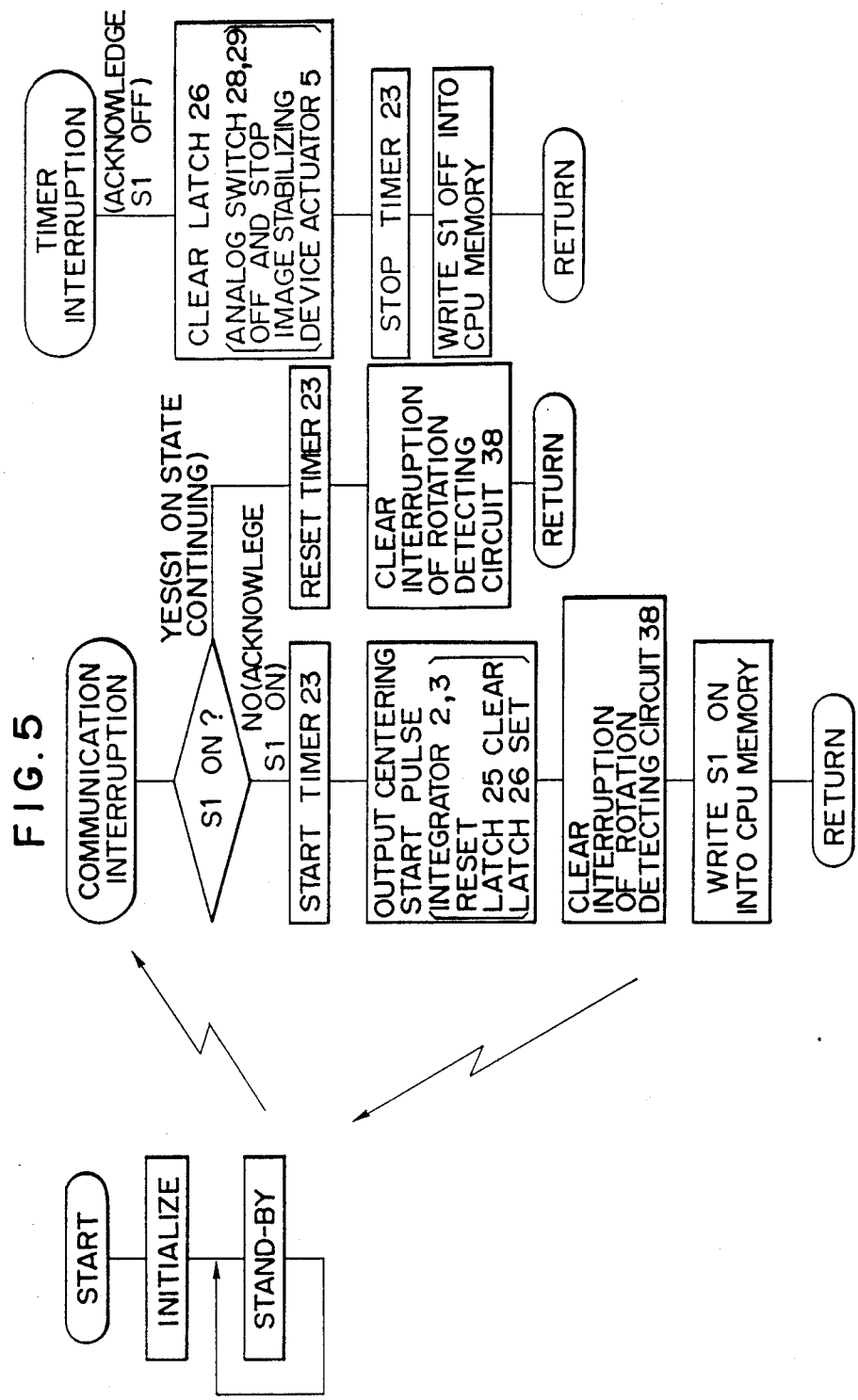
FIG. 5 is a flowchart showing the control sequence of a lens CPU shown in FIG. 4.

FIG. 5 is a flowchart showing the control sequence of the lens CPU 22' in the second embodiment.

In response to the interruption signal from the rotation detecting circuit 38, the lens CPU 22' refers to the internal memory, which stores a status indicating whether the switch 34 has been turned on or not.

If the internal memory indicates that the switch 34 is OFF, the CPU 22' releases an H-level start signal, thereby starting the timer 23. Then, it releases the centering start pulse. The operation resulting from the pulse is the same as that in the first embodiment, and will not, therefore, be explained. Then, the CPU sends a clear pulse to the rotation detecting circuit 38 thereby shifting the interruption signal therefrom to the L-level, and writes a status indicating that the switch 34 has been turned on in the internal memory. Thus, the interruption sequence is terminated.

On the other hand, if the internal memory indicates that the switch 34 has been turned on, the CPU 22' sends a reset pulse to the timer 23, then clears interruption from the rotation detecting circuit 38, and terminates the interruption sequence. In this manner, during the auto focusing operation, the timer 23 is constantly reset, so that no interruption is requested from the timer 23 to the CPU 22'. In this state, the switch 34 is closed and the image stabilizing operation is continued.

The function when the switch 34 is turned off is as follows. Turning off of the switch 34 terminates the automatic focusing operation, so that the auto focusing actuator 36 terminates movement. Consequently, the encoder 37 no longer rotates, and the rotation detecting circuit 38 does not release the interruption signal. Thus, the timer 23 is no longer reset, and sends an H-level interruption signal to the CPU 22' when the internal register reaches zero after a predetermined period. In response, the CPU 22' sends a reset pulse to the latch 26. The operations ensuing said reset pulse are the same, as those in the first embodiment, and will not, therefore, be explained again.

The CPU 22' then shifts the start signal for the timer 23 to the L-level, thereby terminating the timer function, and clears the interruption from the timer 23. The CPU 22' then writes a status indicating the OFF-state of the switch 34 in the internal memory, and terminates the timer interruption sequence.

The sequence relating to the S2 switch 17 is the same as that in the first embodiment, and will not, therefore, be explained again.

In the second embodiment, there is employed an encoder for detecting the movement of the auto focusing actuator, but the present invention is not limited to such embodiment and is subject to various modifications. For example, it is possible to detect the movement of the focusing lens moved by the auto focusing actuator, or to inspect the voltage on a terminal provided between the camera body and the lens and receiving a signal indicating the function of the actuator.

What is claimed is:

1. An image stabilizing device capable of being mounted on a camera having an optical system, comprising:
   (a) image stabilizing means for preventing image blur; and
   (b) control means for controlling said image stabilizing means by automatically responding to the operation of said camera performed independent of the operation of said image stabilizing means.

2. An image stabilizing device according to claim 1, further comprising signal transmitting means for transmitting a signal between said camera and said optical system, said control means having a detecting means for detecting a signal transmitting state of said signal transmitting means.

3. An image stabilizing device according to claim 1, further comprising signal transmitting means for performing an electrical signal transmission between said camera and said optical system, said control means having a detecting means for detecting a signal transmitting state of said signal transmitting means.

4. An image stabilizing device according to claim 1, further comprising a signal transmitting means for performing a mechanical signal transmission between said camera and said optical system, said control means having detecting means for detecting a signal transmission state of said signal transmitting means.

5. An image stabilizing device according to claim 4, wherein said optical system comprises a diaphragm and said detecting means includes diaphragm detecting means for detecting an operation state of said diaphragm.

6. An image stabilizing device according to claim 5, wherein said control means includes means effects an initial state of said image stabilizing means in response to an operation of said diaphragm.

7. An image stabilizing device according to claim 5, wherein said camera includes a shutter release button and said control means includes discrimination means for discriminating that said shutter release button is pressed to a full-stroke position.

8. An image stabilizing device according to claim 4, wherein said optical system includes focusing means and said detecting means includes focus detection means for detecting an operation state of said focusing means.

9. An image stabilizing device according to claim 8, wherein said control means includes means for causing an operation of said image stabilizing operation to start in response to the operation of said focusing means.

10. An image stabilizing device according to claim 8, wherein said camera includes a shutter release button and said control means includes discrimination means for discriminating that said shutter release button is pressed to a half-stroke position.

11. An image stabilizing device according to claim 1, wherein said image stabilizing means is mountably and dismountably constituted to said camera.

12. A camera, comprising:
   (a) image stabilizing means for preventing image blur; and
   (b) control means for controlling said image stabilizing means by automatically responding to operation of the camera performed independently from the operation of said image stabilizing means.

13. A camera according to claim 12, further comprising an optical system, and signal transmitting means for transmitting a signal between said camera and said optical system, said control means having detecting means for detecting a signal transmitting state of said signal transmitting means.

14. A camera according to claim 12, further comprising an optical system, and signal transmitting means for performing an electrical signal transmission between said camera and said optical system, said control means having detecting means for detecting a signal transmitting state of said signal transmitting means.

15. A camera according to claim 12, further comprising an optical system, and a signal transmitting means for performing a mechanical signal transmission between said camera and said optical system, said control means having detecting means for detecting a signal transmission state of said signal transmitting means.

16. A camera according to claim 15, wherein said optical system comprises a diaphragm and said detecting means includes diaphragm detecting means for detecting an operation state of said diaphragm.

17. A camera according to claim 16, wherein said control means includes means for effecting an initial state of said image stabilizing means in response to an operation of said diaphragm.

18. A camera according to claim 16, wherein said camera includes a shutter release button and said control means includes discrimination means for discriminating that said shutter release button is pressed to a full-stroke position.

19. A camera according to claim 15, wherein said optical system includes focusing means and said detecting means includes focus detecting means for detecting an operation state of said focusing means.

20. A camera according to claim 19, wherein said control means includes means for causing an operation of said image stabilizing operation to start in response to the operation of said focusing means.

21. A camera according to claim 19, wherein said camera includes a shutter release button and said control means includes discrimination means for discriminating that said shutter release button is pressed to a half-stroke position.

22. A camera according to claim 12, wherein said image stabilizing means is mountable and dismountable with respect to said camera.

* * * * *

UNITED STATES PATENT AND TRADEMARK OFFICE
CERTIFICATE OF CORRECTION

PATENT NO. : 4,965,619         Page 1 of 2
DATED      : October 23, 1990
INVENTOR(S): SHIKAUMI, ET AL.

It is certified that error appears in the above-identified patent and that said Letters Patent is hereby corrected as shown below:

Title page:

AT [56] References Cited:

"3,910,694 10/1975 De La Cierva" should read --3,910,693 10/1975 De La Cierva--

COLUMN 2

Line 10, "satisfactorY" should read --satisfactory--.
Line 15, "system" should read --system.--
Line 36, "said" should read --the--.
Line 40, "response" should read --respond--.
Line 41, "o" should read --or--.

COLUMN 4

Line 32, "camera," should read --camera--.
Line 34, "flow" should be deleted.
Line 52, "is the" should read --is in the--.
Line 60, "state the" should read --state, the sequence--.

COLUMN 6

Line 24, "discussion" should read --discussion,--
Line 67, "discussion" should read --discussion,--

COLUMN 7

Line 15, "circuit 32" should read --circuit 32,--.

COLUMN 8

Line 30, "a" should read --an--.

UNITED STATES PATENT AND TRADEMARK OFFICE
CERTIFICATE OF CORRECTION

| | |
|---|---|
| PATENT NO. : | 4,965,619 |
| DATED : | October 23, 1990 |
| INVENTOR(S) : | SHIKAUMI, ET AL. |

Page 2 of 2

It is certified that error appears in the above-identified patent and that said Letters Patent is hereby corrected as shown below:

COLUMN 9

Line 47, "a" should be deleted.
Line 54, "a " (first occ.) should be deleted.

Signed and Sealed this

Fifteenth Day of September, 1992

Attest:

DOUGLAS B. COMER

Attesting Officer

Acting Commissioner of Patents and Trademarks